US011850971B2

(12) United States Patent
Miyauchi

(10) Patent No.: US 11,850,971 B2
(45) Date of Patent: Dec. 26, 2023

(54) MOTOR GENERATOR CONTROL SYSTEM AND HYBRID VEHICLE

(71) Applicant: HONDA MOTOR CO., LTD., Tokyo (JP)

(72) Inventor: Masato Miyauchi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/950,806

(22) Filed: Sep. 22, 2022

(65) Prior Publication Data
US 2023/0286389 A1 Sep. 14, 2023

(30) Foreign Application Priority Data
Sep. 29, 2021 (CN) .......................... 202111156489.8

(51) Int. Cl.
| | |
|---|---|
| *B60L 7/10* | (2006.01) |
| *B60L 50/40* | (2019.01) |
| *B60L 58/15* | (2019.01) |
| *B60L 7/14* | (2006.01) |
| *B60W 20/14* | (2016.01) |

(Continued)

(52) U.S. Cl.
CPC ........ *B60L 7/10* (2013.01); *B60L 7/14* (2013.01); *B60L 7/20* (2013.01); *B60L 50/40* (2019.02); *B60L 58/15* (2019.02); *B60W 20/14* (2016.01); *B60L 2240/429* (2013.01); *B60W 20/00* (2013.01)

(58) Field of Classification Search
CPC ...... B60L 7/10; B60L 7/14; B60L 7/20; B60L 50/40; B60L 58/15; B60L 2240/429; B60W 20/14; B60W 20/00

USPC .......................................................... 701/22
See application file for complete search history.

(56) References Cited

U.S. PATENT DOCUMENTS

| | | | | |
|---|---|---|---|---|
| 5,941,328 A | * | 8/1999 | Lyons ................... | B60W 10/18 180/65.245 |
| 6,211,593 B1 | * | 4/2001 | Nashiki ................. | H02K 1/278 310/156.33 |

(Continued)

FOREIGN PATENT DOCUMENTS

| | | | | |
|---|---|---|---|---|
| JP | 2012-213253 A | | 11/2012 | |
| WO | WO-2008018375 A1 | * | 2/2008 | ............. H02K 16/00 |

*Primary Examiner* — Sizo B Vilakazi
*Assistant Examiner* — Brian R Kirby
(74) *Attorney, Agent, or Firm* — Paratus Law Group, PLLC

(57) ABSTRACT

A motor generator control system includes: a motor generator; a drive current control unit configured to perform feedback control so that a driving force at a time of power running or the driving force at a time of regeneration of the motor generator is a target driving force; a current coordinate control unit configured to output a d-axis current value and a q-axis current value to the drive current control unit; and a strong field control unit configured to perform strong field control of setting a field to be stronger than a field strength at which a maximum efficiency is obtained. When the strong field control is performed during the regeneration, the motor generator control system executes current consumption control of performing the feedback control by changing the d-axis current value and the q-axis current value so that the driving force is smaller than the target driving force.

5 Claims, 13 Drawing Sheets

(51) Int. Cl.
*B60L 7/20* (2006.01)
*B60W 20/00* (2016.01)

(56) References Cited

U.S. PATENT DOCUMENTS

| | | | |
|---|---|---|---|
| 2005/0029972 A1* | 2/2005 | Imai | B60L 15/025 |
| | | | 318/400.04 |
| 2005/0127857 A1* | 6/2005 | Miyauchi | H02P 21/18 |
| | | | 318/400.33 |
| 2007/0200529 A1* | 8/2007 | Kaneko | B60L 50/61 |
| | | | 318/801 |
| 2009/0243522 A1* | 10/2009 | Suhama | H02P 21/20 |
| | | | 318/376 |
| 2011/0241583 A1* | 10/2011 | He | H02P 27/08 |
| | | | 318/400.09 |
| 2012/0203404 A1* | 8/2012 | Mituta | B60L 15/2009 |
| | | | 180/65.265 |
| 2012/0249024 A1* | 10/2012 | Saha | B60L 15/025 |
| | | | 318/400.02 |
| 2014/0001987 A1* | 1/2014 | Okada | H02P 3/12 |
| | | | 318/370 |
| 2015/0202966 A1* | 7/2015 | Oyama | B60L 3/0046 |
| | | | 701/22 |
| 2017/0036671 A1* | 2/2017 | Fukuchi et al. | B60L 50/61 |
| 2017/0257055 A1* | 9/2017 | Kitaori et al. | B60W 30/1843 |
| 2017/0282751 A1* | 10/2017 | Fukuchi et al. | B60L 50/61 |
| 2018/0115272 A1* | 4/2018 | Kitaori et al. | B60L 15/2045 |
| 2018/0215372 A1* | 8/2018 | Hosokawa | F02B 39/10 |

\* cited by examiner

MOTOR GENERATOR CONTROL SYSTEM AND HYBRID VEHICLE

CROSS-REFERENCE TO RELATED APPLICATIONS

The present application claims the benefit of priority of Chinese Patent Application No. 202111156489.8, filed on Sep. 29, 2021, the content of which is incorporated herein by reference.

TECHNICAL FIELD

The present invention relates to a motor generator control system and a hybrid vehicle.

BACKGROUND ART

In recent years, as a specific measure against global climate change, efforts toward implementation of a low-carbon society or a decarbonized society have become active. Also in vehicles, a reduction in $CO_2$ emission is strongly required, and a drive source is rapidly electrified. Specifically, a vehicle including an electric motor as a drive source of the vehicle and a battery as a secondary battery capable of supplying an electric power to the electric motor, such as an electrical vehicle or a hybrid electrical vehicle, has been developed.

JP-A-2012-213253 describes a technique of performing weak field control or strong field control to increase an armature current of an AC motor while maintaining a torque of the AC motor under a condition that a surplus power is generated in a charging power for charging a battery, so that the surplus power which cannot be charged to the battery is consumed in the AC motor, and deterioration of a power storage device due to overcharge is prevented.

However, there is room for further improvement in the method for consuming surplus power by regeneration.

SUMMARY

The present invention provides a motor generator control system and a hybrid vehicle capable of limiting an amount of charge of a battery by regenerative braking when the battery is fully charged or nearly fully charged.

According to an aspect of the present invention, there is provided a motor generator control system including: a motor generator configured to perform power running using electric power from a capacitor, and to regenerate by a driving force input from a drive wheel to charge the capacitor; a drive current control unit configured to perform feedback control based on a drive current of the motor generator so that the driving force at a time of power running or the driving force at a time of regeneration of the motor generator is a target driving force; a current coordinate control unit configured to calculate a d-axis current value and a q-axis current value based on the drive current of the motor generator and output the d-axis current value and the q-axis current value to the drive current control unit; and a strong field control unit configured to perform strong field control of setting a field to be stronger than a field strength at which a maximum efficiency is obtained on a constant driving force line of the motor generator, where when the strong field control is performed during the regeneration, the motor generator control system executes current consumption control of performing the feedback control by changing the d-axis current value and the q-axis current value so that the driving force is smaller than the target driving force.

According to another aspect of the present invention, there is provided a hybrid vehicle including: an internal combustion engine; a capacitor; a first motor generator configured to generate electric power by power of the internal combustion engine; a second motor generator configured to be driven by electric power from the capacitor or the first motor generator; and the motor generator control system according to any one of claims 1 to 4, where: the motor generator of the motor generator control system is the second motor generator; at a time of regeneration in the second motor generator, the hybrid vehicle performs power running by regenerative electric power of the second motor generator, with the first motor generator as an electric motor, and executes the current consumption control for the second motor generator; and at a time of power running of the first motor generator, the hybrid vehicle takes the internal combustion engine as a load of the first motor generator, changes the d-axis current value and the q-axis current value of the first motor generator so that the driving force is smaller than the target driving force, and performs the feedback control based on a drive current of the first motor generator so that the driving force at a time of power running of the first motor generator is the target driving force.

According to the present invention, it is possible to limit an amount of charge of a battery by regenerative braking when the battery is fully charged or nearly fully charged.

DESCRIPTION OF EMBODIMENTS

Hereinafter, an embodiment of the present invention will be described with reference to the drawings.

A hybrid electric vehicle (HEV) includes a motor generator and an engine, and travels by a driving force of the motor generator and/or the engine in accordance with a traveling state of the vehicle. HEVs are roughly divided into a series type and a parallel type. An HEV of the series type runs by the power of the motor generator. The engine is mainly used for power generation, and the electric power generated by another motor generator by the power of the engine is charged to a battery or supplied to the motor generator. On the other hand, an HEV of the parallel type travels by a driving force of one or both of the motor generator and the engine.

Configuration

Figure 1:
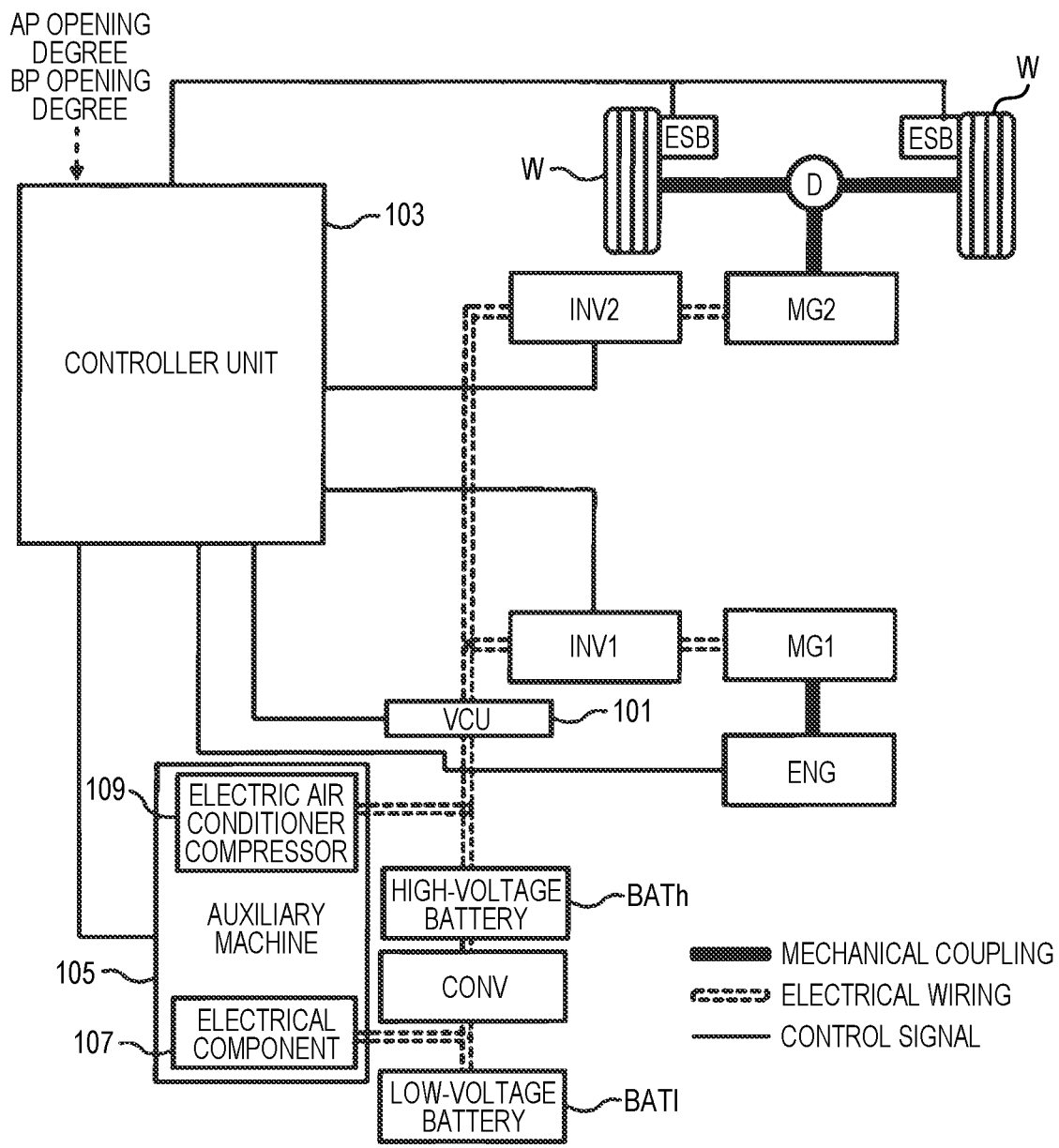
FIG. 1 is a block diagram illustrating an internal configuration of an HEV (hybrid vehicle) of a series type.

FIG. 1 is a block diagram illustrating an internal configuration of an HEV of the series type. As illustrated in FIG. 1, the HEV (hereinafter referred to as "hybrid vehicle") of the series-type includes an engine ENG, a first motor generator MG1, a second motor generator MG2, a high-voltage battery BATh, a converter CONV, a low-voltage battery BATl, a VCU (voltage control unit) 101, a first inverter INV1, a second inverter INV2, an electric servo brake ESB, and a controller unit 103. In FIG. 1, a thick solid line indicates mechanical connection, a double broken line indicates power wiring, and a thin solid arrow indicates a control signal.

The engine ENG drives the first motor generator MG1 as a generator. The engine ENG also functions as a load of the first motor generator MG1 which operates as an electric motor during braking of the hybrid vehicle. The first motor generator MG1 is driven by the power of the engine ENG to generate electric power. The second motor generator MG2 operates as an electric motor by power supply from at least one of the high-voltage battery and the first motor generator MG1, and generates power for hybrid vehicle to travel. A torque generated by the second motor generator MG2 is transmitted to drive wheels W via a speed reducer D. The second motor generator MG2 operates as a generator during braking of the hybrid vehicle.

The high-voltage battery BATh includes a plurality of power storage cells connected in series, and supplies a high voltage of, for example, 100V to 200V. The power storage cell is, for example, a lithium-ion battery or a nickel-hydrogen battery. The converter CONV steps down a DC output voltage of the high-voltage battery BATh in the DC form. The low-voltage battery BATl stores the voltage stepped down by the converter CONV, and supplies a constant voltage of, for example, 12V to an electrical component 107 included in an auxiliary machine 105.

The VCU 101 steps up an input voltage of the second motor generator MG2 when the second motor generator MG2 operates as an electric motor. The VCU 101 steps down an output voltage of the second motor generator MG2 when the second motor generator MG2 operates as a generator during braking of the hybrid vehicle. Further, the VCU 101 steps down the electric power generated by the first motor generator MG1 by the driving of the engine ENG and converted into a direct current. The electric power stepped down by the VCU 101 is supplied to an electric air conditioner compressor 109 included in the auxiliary machine 105 or is charged to the high-voltage battery BATh.

Figure 2:
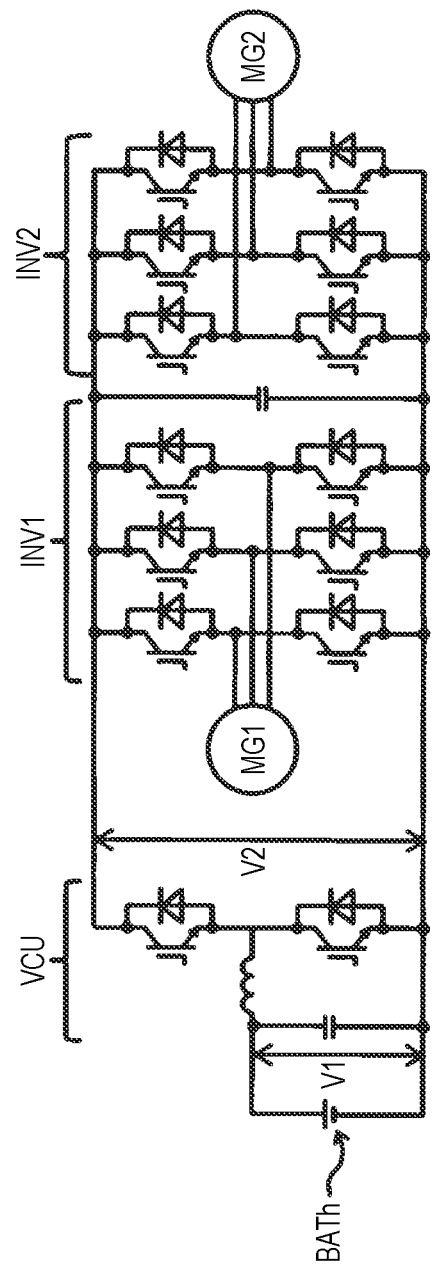
FIG. 2 is an electric circuit diagram of the HEV of FIG. 1.

FIG. 2 is an electric circuit diagram illustrating a correlation between the high-voltage battery BATh, the VCU 101, the first inverter INV1, the second inverter INV2, the first motor generator MG1, and the second motor generator MG2. As illustrated in FIG. 2, the VCU 101 switches on/off of two switching elements using a V1 voltage output from the high-voltage battery BATh as the input voltage, thereby stepping up a V2 voltage on an output side to a voltage higher than the V1 voltage. The V2 voltage w % ben the VCU 101 does not switch on/off of the two switching elements is equal to the V1 voltage.

The first inverter INV1 converts an AC voltage generated by the first motor generator MG1 by driving the engine ENG to a DC voltage. During braking of the hybrid vehicle, the first inverter INV1 converts a DC voltage generated by the second motor generator MG2 and converted by the second inverter INV2 into an AC voltage, and supplies a three-phase current to the first motor generator MG1. The second inverter INV2 converts a DC voltage into an AC voltage and supplies a three-phase current to the second motor generator MG2. During braking of the hybrid vehicle, the second inverter INV2 converts an AC voltage generated by the second motor generator MG2 into a DC voltage.

Returning to FIG. 1, the electric servo brake ESB brakes the hybrid vehicle by the oil pressure controlled in accordance with the operation on the brake pedal by the driver of the hybrid vehicle.

The controller unit 103 controls the first inverter INV1, the second inverter INV2, the VCU 101, the engine ENG, the electric servo brake ESB, and the auxiliary machine 105. The controller unit 103 will be described in detail later.

Effect

Figure 3:
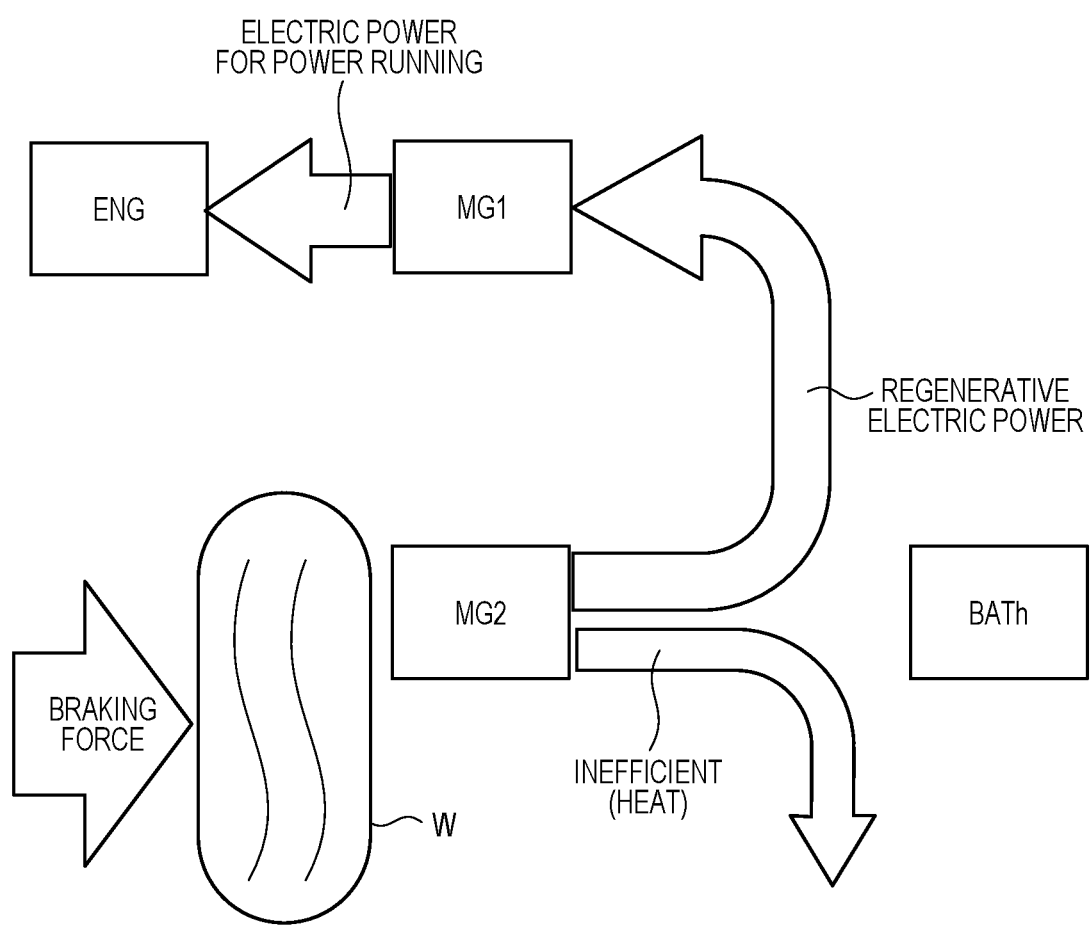
FIG. 3 is an explanatory diagram illustrating a flow of energy during braking of the hybrid vehicle when a first motor generator is driven as an electric motor by regenerative electric power generated by a second motor generator.

In the present embodiment, braking of the hybrid vehicle uses regenerative braking of operating the second motor generator MG2 as a generator. However, when the high-voltage battery BATh is fully charged and thus the regenerative electric power generated by the second motor generator MG2 cannot be charged to the high-voltage battery BATh, the first motor generator MG1 is driven as an electric motor by the regenerative electric power, and the engine ENG becomes the load of the first motor generator MG1. FIG. 3 is an explanatory diagram illustrating a flow of energy during braking of the hybrid vehicle when the first motor generator MG1 is driven as an electric motor by regenerative electric power generated by the second motor generator MG2.

In the present embodiment, as illustrated in FIG. 3, since strong field control is performed during regeneration of the second motor generator MG2, the second motor generator MG2 is driven at an inefficient operating point. In the second motor generator MG2 in which the strong field control is performed, the output efficiency decreases, and the heat generation amount increases mainly due to copper loss. In the present embodiment, the efficiency is further reduced with respect to a general strong field control. Hereinafter, the strong field control of the present embodiment will be referred to as current consumption control.

First, a general strong field control will be described.

An operating point of a motor generator represented by the second motor generator MG2 on the dq axis coordinate and a V2 voltage applied to the motor generator in the case of performing the strong field control will be described.

The range of the operating point of the motor generator is restricted by a maximum current Imax that can be supplied to the motor generator and the voltage applied to the motor generator. The amplitude of the current (Id, Iq) of the motor generator is restricted by the maximum current Imax, and thus needs to satisfy Formula (1).

[Equation 1]

The induced voltage (Vdo, Vqo) of the motor generator is expressed by Formula (2).

[Equation 2]

Here, Ld and Lq are the dq axis inductance, ω is the angular velocity of the motor generator, and ψa is the interlinkage magnetic flux.

According to Formula (2), the dq induced voltage (the magnitude of the vector sum of the induced voltage generated in the d-axis armature and the induced voltage generated in the q-axis armature) Vo can be expressed by Formula (3).

[Equation 3]

At this time, assuming that the limit voltage of the V2 voltage illustrated in FIG. 2 is Vom (Vom is determined by the V2 voltage, and the relational expression changes depending on the modulation method of the control of the VCU 101), the dq induced voltage Vo needs to be equal to or less than the limit voltage Vom as illustrated in Formula (4).

[Equation 4]

That is, the range of the operating point of the motor generator is restricted by the voltage according to Formulae (3) and (4), and thus needs to satisfy Formula (5).

[Formula 5]

Figure 4:
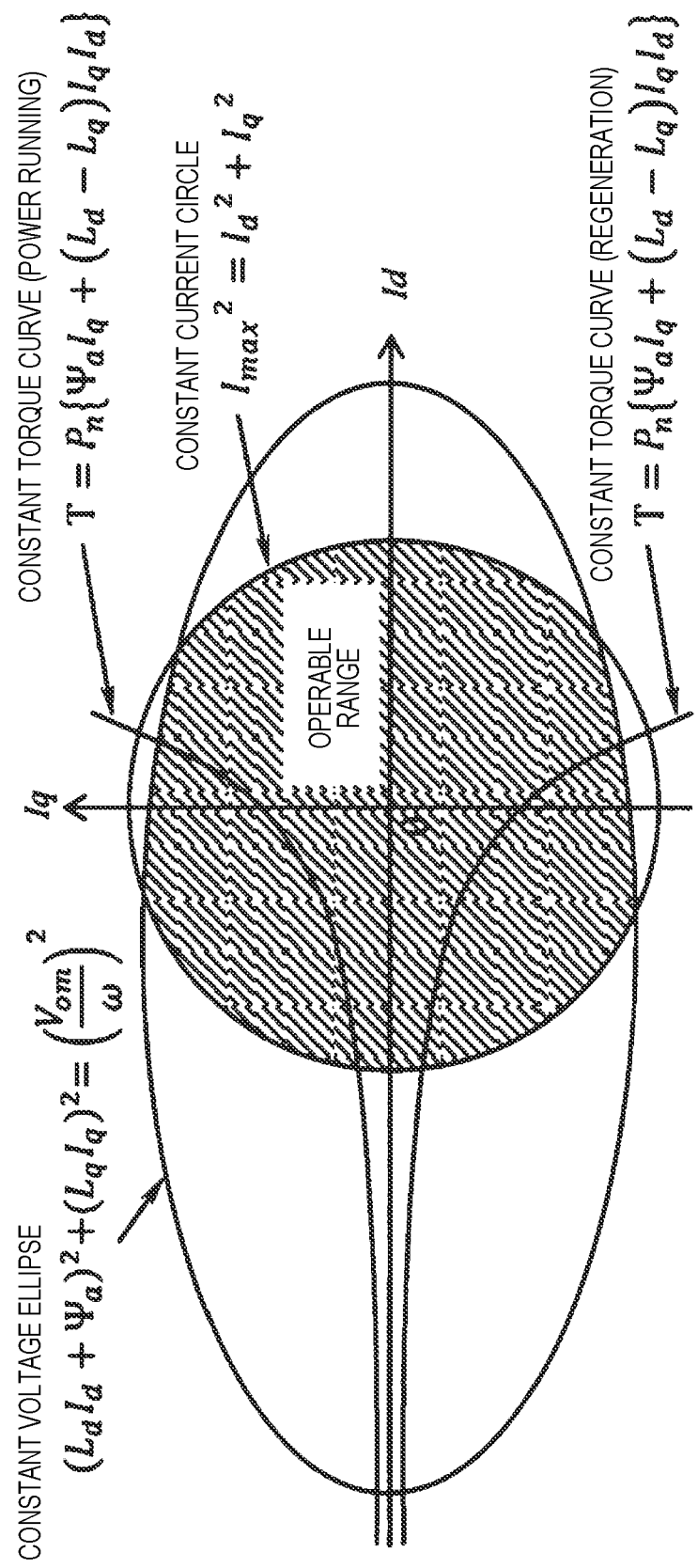
FIG. 4 is a diagram illustrating restriction by current and restriction by voltage of an operating point of a motor generator in a dq-axis current vector space.

As described above, the restriction by the current of the operation of the motor generator is expressed by Formula (1), and Formula (1) is expressed by the internal region of the constant current circle in the dq-axis current vector space illustrated in FIG. 4. The restriction by the voltage of the operation of the motor generator is expressed by Formula (5), and Formula (5) is expressed by the internal region of the constant voltage ellipse in the dq-axis current vector space illustrated in FIG. 4. The range of the current that can be supplied to the motor generator is a range that satisfies Formula (1) and Formula (5), and this range is indicated by the hatched region in FIG. 4.

On the other hand, a torque T of the motor generator is expressed by Formula (6).

[Equation 6]

Here, Pn is the number of pole pairs of the motor generator.

A formula expressing the constant torque curve obtained by modifying Formula (6) is expressed by Formula (7).

[Equation 7]

Formula (7) is a hyperbolic curve with Id=ψa/(Lq−Ld) and Iq=0 as asymptotic lines.

Incidentally, in the control of the operating point of the motor generator without performing the strong field control, for example, maximum-torque control of maximizing the torque with respect to the current (control in which the tangent of the constant torque curve and the current vector at the operating point are orthogonal to each other) or efficiency optimum control of minimizing the loss in consideration of not only the copper loss but also the iron loss or the like (the operating point is often advanced in phase relative to the maximum-torque control, that is, the d-axis current is moved in the negative direction) is performed. That is, in the example illustrated in FIG. 5, the motor generator is driven at the operating point indicated by the dotted circle.

Figure 5:
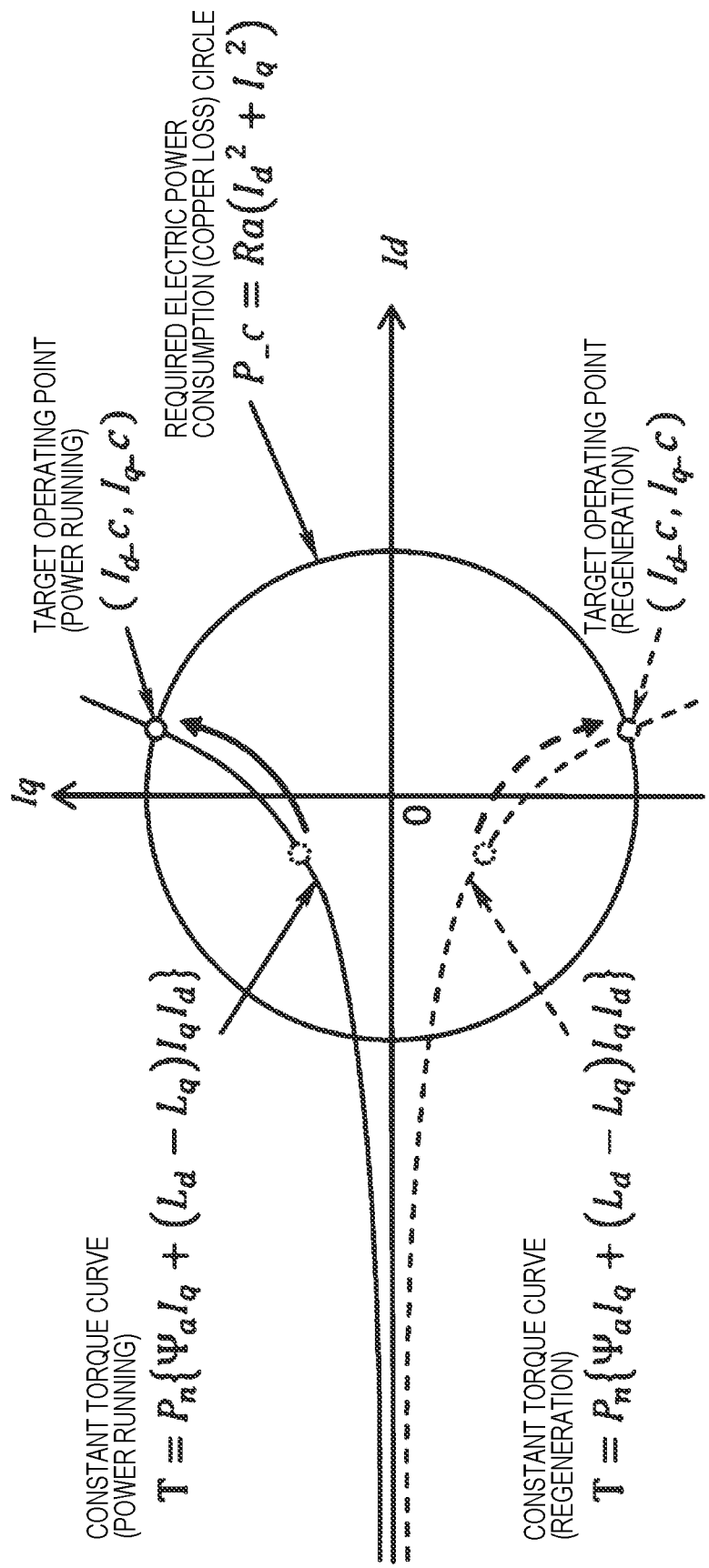
FIG. 5 is a diagram illustrating transition of the operating point of the motor generator before and after performing strong field control.

On the other hand, in general strong field control, as illustrated in FIG. 5, the inverter INV is controlled such that the d-axis current of the motor generator MG increases to a positive value, thereby moving the operating point of the motor generator MG to the target operating point (Id_c, Iq_c). The V2 voltage for providing the current vector at the target operating point (Id_c, Iq_c) is the maximum voltage that can be taken within the range of the restriction by the constant current circle of the maximum current Imax and the restriction by the orientation voltage ellipse, and the d-axis current becomes the largest in the positive direction under the condition of constant torque.

Next, current consumption control of the present embodiment, which is the strong field control, will be described.

Figure 6:
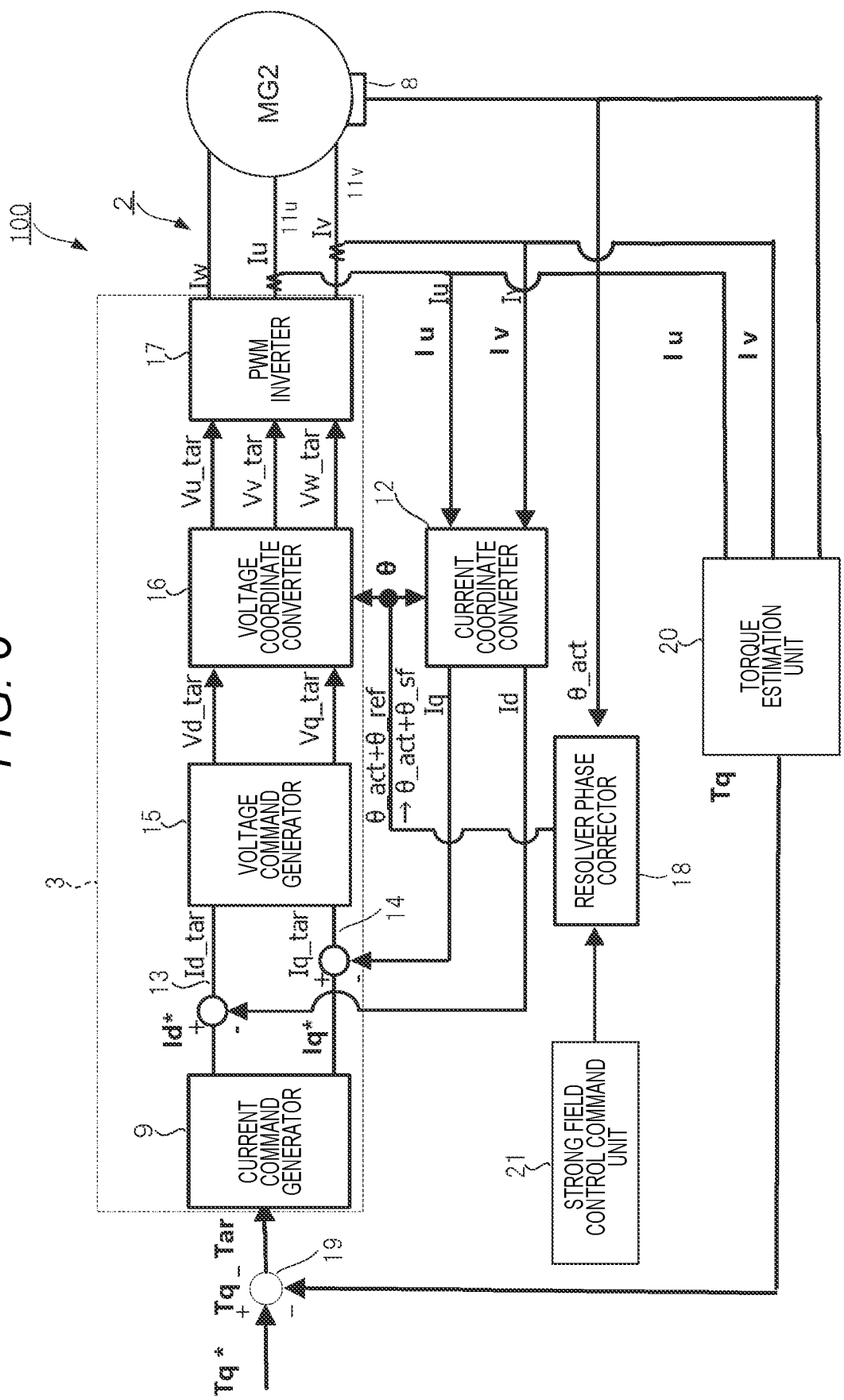
FIG. 6 is a block diagram illustrating a configuration example of a motor generator control system according to an embodiment of the present invention.

FIG. 6 is a block diagram of a motor generator control system 100 of a second motor generator MG2 according to the present embodiment. The motor generator control system 100 illustrated in FIG. 6 includes a second motor generator MG2 and a motor control device 2 that performs current control of the second motor generator MG2.

The second motor generator MG2 is a three-phase AC rotary electric machine including a rotor and a stator. The rotor is assembled with a resolver 8 that detects the magnetic pole position, that is, the rotation angle of the rotor. The resolver 8 is a known resolver configured with a Hall element or a rotary encoder, and outputs a signal indicating the detection value of the rotation angle of the magnetic poles from a predetermined reference rotational position of the rotor as a detection signal of the magnetic pole position. The detection value of the rotation angle obtained by the resolver 8 (hereinafter referred to as a magnetic pole detection angle θ_act) generally causes a magnetic pole position error angle θ_ref with respect to the actual magnetic pole position of the rotor (actual rotation angle of the magnetic poles) due to an assembling error of the resolver 8, a detection error of the resolver 8, or a resolver abnormality.

The motor control device 2 includes a current command generator 9, a current sensor 11u, a current sensor 11v, a current coordinate converter 12, a subtraction processor 13, a subtraction processor 14, a voltage command generator 15, a voltage coordinate converter 16, a PWM (pulse width modulation) inverter 17, a resolver phase corrector 18, a subtraction processor 19, a torque estimation unit 20, and a strong field control command unit 21. The motor control device 2 performs the operation control of the second motor generator MG2 by vector control using the dq coordinate system described above. Here, a combination of the current command generator 9, the subtraction processor 13, the subtraction processor 14, the voltage command generator 15, the voltage coordinate converter 16, and the PWM inverter 17 is an example of the drive current control unit 3 of the present invention.

The current command generator 9 calculates a d-axis current command value Id* and a q-axis current command value Iq* in accordance with a torque command value Tq_tar, which is a command value of torque generated in the second motor generator MG2. The d-axis current command value Id* and the q-axis current command value Iq* are the d-axis component and the q-axis component of the command value of the current (drive current) flowing to the stator of the second motor generator MG2.

The current sensor 11u and the current sensor 11v respectively detect the drive currents Iu and Iv flowing through the U phase and the V phase of the stator (armature) of the second motor generator MG2. Since the stator of the second motor generator MG2 has three phases, the current flowing through any one phase is uniquely determined by the currents flowing through the other two phases. For example, the current flowing through the W phase is −(Iu+Iv). Therefore, in the present embodiment, the current sensors 11$u$ and 11$v$ detect currents of two phases (U phase and V phase in the present embodiment).

The current coordinate converter 12 calculates the d-axis current value Id and the q-axis current value Iq at the command value coordinates d*–q* by coordinate conversion of the detection values of the drive currents Iu and Iv detected by the current sensor 11$u$ and the current sensor 11$v$. Here, the command value coordinates d*–q* indicate the dq coordinates used in the calculation in the motor control device 2. The motor control device 2 detects the command value coordinates d*–q* based on a magnetic pole rotation angle θ obtained by correcting the magnetic pole detection angle θ_act detected by the resolver 8. The magnetic pole rotation angle θ is a value obtained by adding a resolver zero point correction value θ_ref for efficiency optimum control to the magnetic pole detection angle θ_act. The motor control device 2 may detect the command value coordinates d*–q* based on a magnetic pole rotation angle θ_act+θ_sf obtained by adding a resolver zero point correction value θ_sf for strong field to the magnetic pole detection angle θ_act detected by the resolver 8. The resolver zero point correction value θ_sf for strong field will be described later. The command value coordinates d*–q* detected based on the magnetic pole detection angle θ_act before being corrected do not coincide with the dq coordinates caused by the hardware of the second motor generator MG2 (that is, actual dq coordinates), and there is an error according to the magnetic pole position error angle θ_ref between the two coordinates including the command value coordinates d*–q* and the dq coordinates. On the other hand, at the corrected magnetic pole rotation angle θ, the dq coordinates caused by the hardware of the second motor generator MG2 coincides with the command value coordinates d*–q*. The coordinate transformation by the current coordinate converter 12 is performed by using the magnetic pole rotation angle θ to indicate the rotation angle of the magnetic poles of the rotor of the second motor generator MG2.

Id and Iq obtained by the coordinate transformation have a meaning as the detection value of the d-axis current and the detection value of the q-axis current at the command value coordinates d*–q* determined by the magnetic pole rotation angle θ (dq coordinates determined with θ as the rotational position of the d-axis).

Returning to FIG. 6, the subtraction processor 13 calculates and outputs a deviation Id_Tar (Id*–Id) between the d-axis current command value Id* output by the current command generator 9 and the d-axis current value Id output by the current coordinate converter 12. The subtraction processor 14 calculates and outputs a deviation Iq_Tar (Iq*–Iq) between the q-axis current command value Iq* output by the current command generator 9 and the q-axis current value Iq output by the current coordinate converter 12.

The voltage command generator 15 obtains a d-axis voltage command value Vd_tar and a q-axis voltage command value Vq_tar, which are command values of the applied voltages in the respective axial directions at the command value coordinates d*–q* in accordance with the deviations output by the subtraction processors 13 and 14 (Id_tar and Iq_tar). For example, the voltage command generator 15 obtains the d-axis voltage command value Vd_tar and the q-axis voltage command value Vq_tar by PI control (feedback control such as proportional control and integral control) so as to set the deviations (Id_tar and Iq_tar) to "0".

The voltage coordinate converter 16 performs coordinate conversion on the d-axis voltage command value Vd_tar and the q-axis voltage command value Vq_tar obtained by the voltage command generator 15 to calculate command values Vu_tar, Vv_tar, and Vw_tar of the applied voltages of the respective phases of the stator of the second motor generator MG2 (hereinafter referred to as phase voltage command values Vu_tar, Vv_tar, and Vw_tar). The coordinate transformation by the voltage coordinate converter 16 is performed using the same magnetic pole rotation angle θ as that used in the coordinate transformation of the current coordinate converter 12.

The phase voltage command values Vu_tar, Vv_tar, and Vw_tar determined by the coordinate transformation define the magnitudes and phases of the applied voltages of the respective phases U. V, and W of the stator of the second motor generator MG2.

The PWM inverter 17 controls the actual applied voltage of each phase of the stator of the second motor generator MG2 according to the phase voltage command values Vu_tar. Vv_tar, and Vw_tar calculated by the voltage coordinate converter 16. The PWM inverter 17 controls the magnitudes (amplitudes) and phases of the applied voltages of the respective phases U. V, and W of the stator of the second motor generator MG2 according to the phase voltage command values Vu_tar, Vv_tar, and Vw_tar.

The resolver phase corrector 18 adds the magnetic pole position error angle θ_ref representing the error angle from the actual rotation angle of the magnetic poles to the magnetic pole detection angle θ_act output by the resolver 8 as the resolver zero point correction value and outputs the result (hereinafter, the magnetic pole position error angle θ_ref is referred to as the resolver zero point correction value θ_ref for efficiency optimum control). The resolver phase corrector 18 stores the resolver zero point correction value θ_ref for efficiency optimum control, which is known in design, and adds and the resolver zero point correction value θ_ref for efficiency optimum control to the magnetic pole detection angle θ_act during normal operation and outputs the result. The normal operation means the operation other than the strong field control (current consumption control).

Further, a strong field control command is input from the strong field control command unit 21 to the resolver phase corrector 18. When the strong field control command is input, the resolver phase corrector 18 adds the resolver zero point correction value θ_sf for strong field control to the magnetic pole detection angle θ_act detected by the resolver 8 and outputs the result.

The strong field control command unit 21 outputs the strong field control command to the resolver phase corrector 18 when the high-voltage battery BATh is fully charged or nearly fully charged.

The torque estimation unit 20 estimates and outputs the drive torque Tq based on the detection values of the drive currents Iu and Iv detected by the current sensor 11$u$ and the current sensor 11$v$, the magnetic pole detection angle θ_act output from the resolver 8, and the like.

The subtraction processor 19 calculates a deviation Tq*–Tq between the target torque Tq* and the drive torque Tq output from the torque estimation unit 20, and outputs the deviation Tq*–Tq as the torque command value Tq_tar. The target torque Tq* is set in accordance with the operation state of the vehicle (the accelerator operation amount or the like) by an arithmetic processing device (not illustrated). The current command generator 9 obtains the d-axis current command value Id* and the q-axis current command value Iq* by P1 control (feedback control such as proportional control and integral control) on the torque command value Tq_tar for setting the deviation Tq*−Tq to "0", for example.

In the motor generator control system 100 configured as described above, the second motor generator MG2 is powered by the electric power from the high-voltage battery BATh, and is regenerated by the torque input from the drive wheels W to charge the high-voltage battery BATh. The drive current control unit 3 including the current command generator 9, the subtraction processor 13, the subtraction processor 14, the voltage command generator 15, the voltage coordinate converter 16, and the PWM inverter 17 performs feedback control based on the drive currents Iu and Iv of the second motor generator MG2 such that the driving force at the time of power running of the second motor generator MG2 or the drive torque Tq at the time of regeneration is the target torque Tq*. The current coordinate converter 12 calculates the d-axis current value Id and the q-axis current value Iq based on Iu and Iv of the second motor generator MG2 and outputs the d-axis current value Id and the q-axis current value Iq to the drive current control unit 3. Further, when performing the strong field control (current consumption control), the strong field control command unit 21 outputs the strong field control command to the resolver phase corrector 18.

Figure 7:
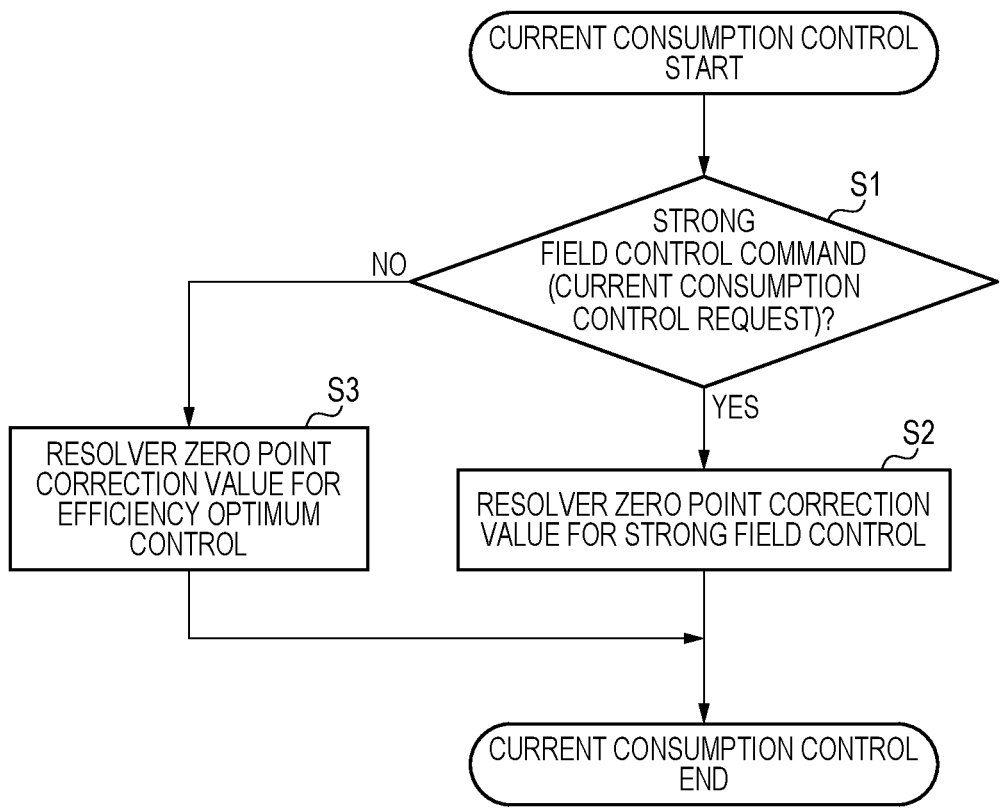
FIG. 7 is a flowchart illustrating an operation example of a resolver phase corrector 18 illustrated in FIG. 6.

Here, as illustrated in FIG. 7, when the strong field control command (current consumption control request) from the strong field control command unit 21 is input (YES in S1), the resolver phase corrector 18 adds the resolver zero point correction value θ_sf for strong field control to the magnetic pole detection angle θ_act detected by the resolver 8 and outputs the result (S2). In other words, the resolver phase corrector 18 switches the resolver zero point correction value θ_ref for efficiency optimum control used in the normal operation to the resolver zero point correction value θ_sf for strong field control. The resolver zero point correction value θ_sf for strong field control is obtained by adding the error angle α to the resolver zero point correction value θ_ref for efficiency optimum control. The error angle α is a value set such that the drive torque Tq is smaller than the target torque Tq*. The error angle α is 0°<α<90°. That is, the drive torque Tq in the strong field control is temporarily smaller than the target torque Tq* in the efficiency optimum control due to the error angle α which is the difference between the resolver zero point correction value θ_sf for strong field control and the resolver zero point correction value θ_ref for efficiency optimum control.

Figure 8:
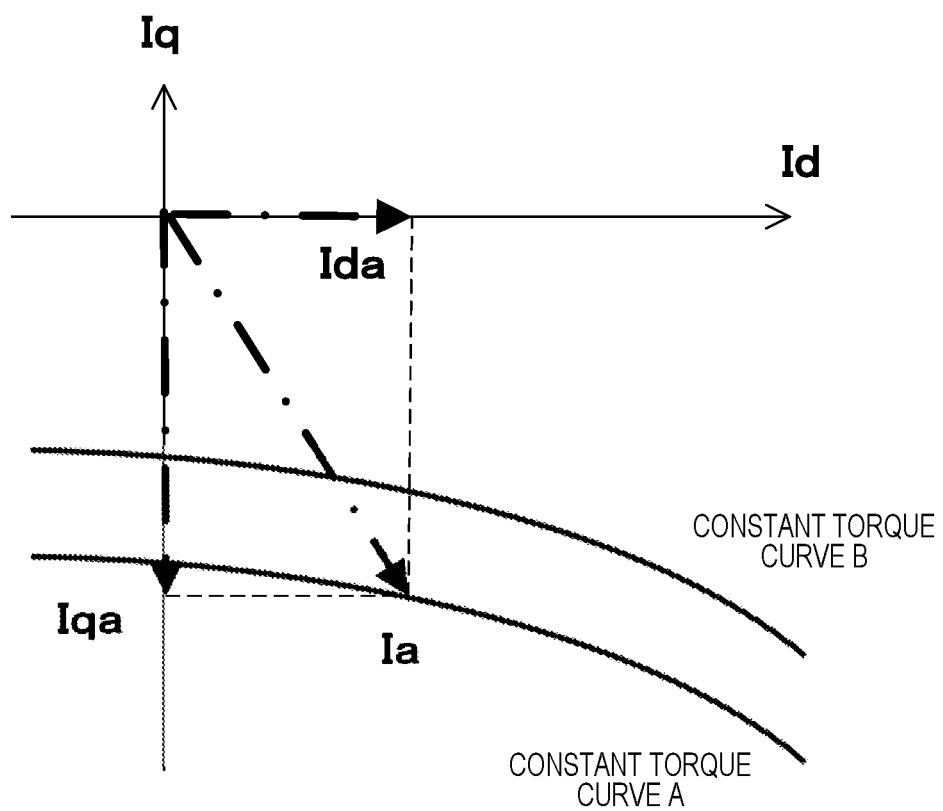
FIG. 8 is a graph illustrating a d-axis current value Ida and a q-axis current value Iqa when efficiency optimum control is performed at an operating point Ia.
Figure 9:
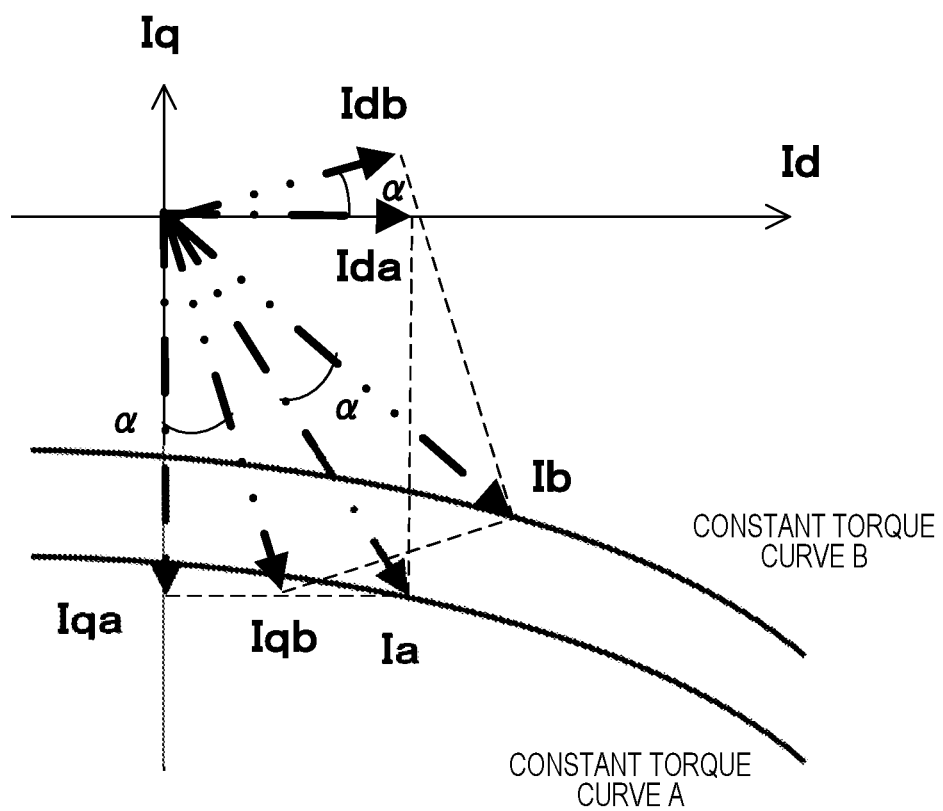
FIG. 9 is a graph illustrating a d-axis current value Idb and a q-axis current value Iqb at an operating point Ib transitioned due to an error angle α in the strong field control (current consumption control) from the efficiency optimum control of FIG. 8.

The operation by the error angle α will be further described with reference to FIGS. 8 and 9. The one-dot chain line in FIG. 8 indicates the d-axis current value Ida and the q-axis current value Iqa when the operating point Ia is located on the constant torque curve A in the efficiency optimum control. Similar to FIG. 8, the one-dot chain line in FIG. 9 indicates the d-axis current value Ida and the q-axis current value Iqa when the operating point Ia is located on the constant torque curve A in the efficiency optimum control. The two-dot chain line in FIG. 9 is a diagram illustrating the d-axis current value Idb (Idb=Ida×cos α) and the q-axis current value Iqb (Iqb=Iqa×cos α) that have transitioned by the error angle α in the strong field control. As illustrated in FIG. 9, in the strong field control, due to the error angle α, the d-axis current value Ida and the q-axis current value Iqa in the efficiency optimum control transition to the d-axis current value Idb and the q-axis current value Iqb, and the operating point Ia on the constant torque curve A transitions to the operating point Ib on the constant torque curve B indicating the torque lower than the constant torque curve A.

When the target torque Tq* is the operating point Ia, by the resolver phase corrector 18 adding the resolver zero point correction value θ_ref for efficiency optimum control to the magnetic pole detection angle θ_act and outputting the result, the d-axis current value and the q-axis current value output from the current coordinate converter 12 are Ida and Iqa. On the other hand, when the resolver phase corrector 18 adds the resolver zero point correction value θ_sf for strong field control to the magnetic pole detection angle θ_act and outputs the result, the d-axis current value and the q-axis current value output from the current coordinate converter 12 are Idb and Iqb due to the error angle α. As a result, the torque estimation unit 20 detects the drive torque Tq which is smaller than the target torque Tq*.

Figure 10:
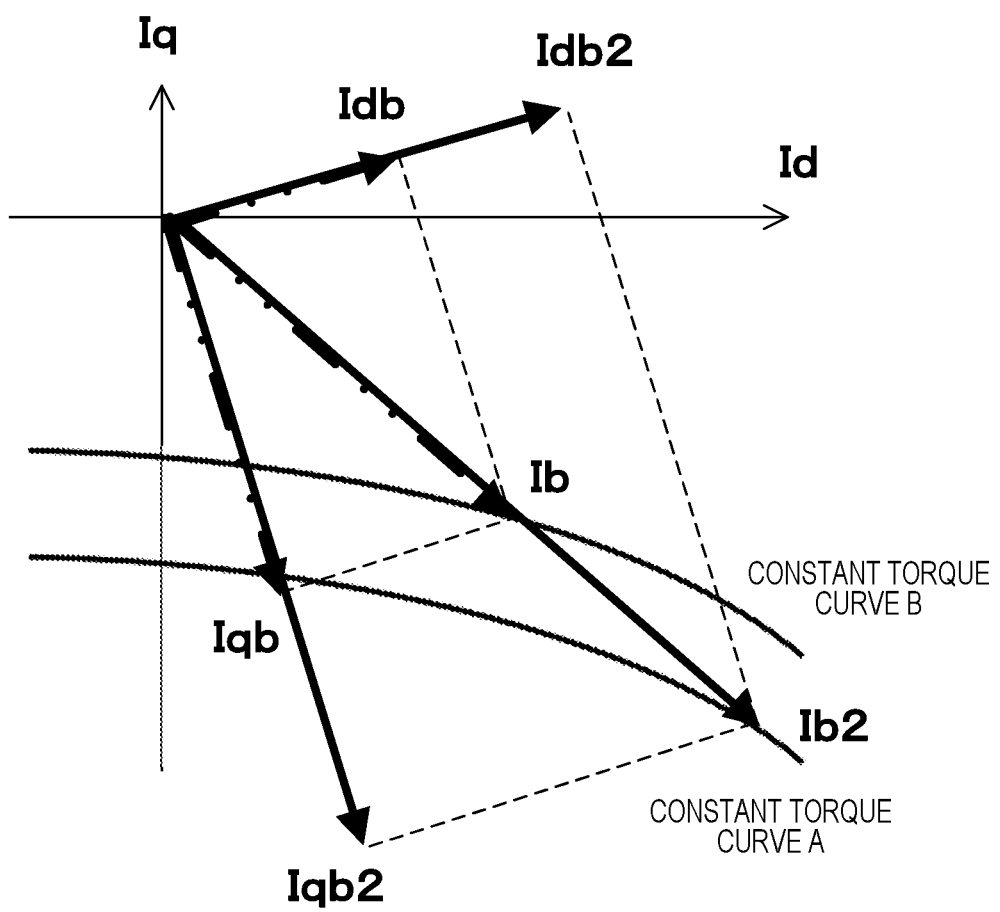
FIG. 10 is a graph illustrating a d-axis current value Idb2 and a q-axis current value Iqb2 at an operating point Ib2 transitioned due to feedback control in the strong field control (current consumption control).

The drive torque Tq output by the torque estimation unit 20 is input to the subtraction processor 19 as described above, and the current command generator 9 performs feedback control such that the deviation Tq*−Tq between the target torque Tq* and the drive torque Tq output from the torque estimation unit 20 is set to "0". Through the feedback control, the current command generator 9 sets the d-axis current command value Id* and the q-axis current command value Iq* such that the operating point Ib that has transitioned from the constant torque curve A to the constant torque curve B due to the error angle α becomes the constant torque curve A again. Therefore, as illustrated in FIG. 10, the current command generator 9 sets Idb2 as the d-axis current command value Id* and Iqb2 as the q-axis current command value Iq*.

Figure 11:
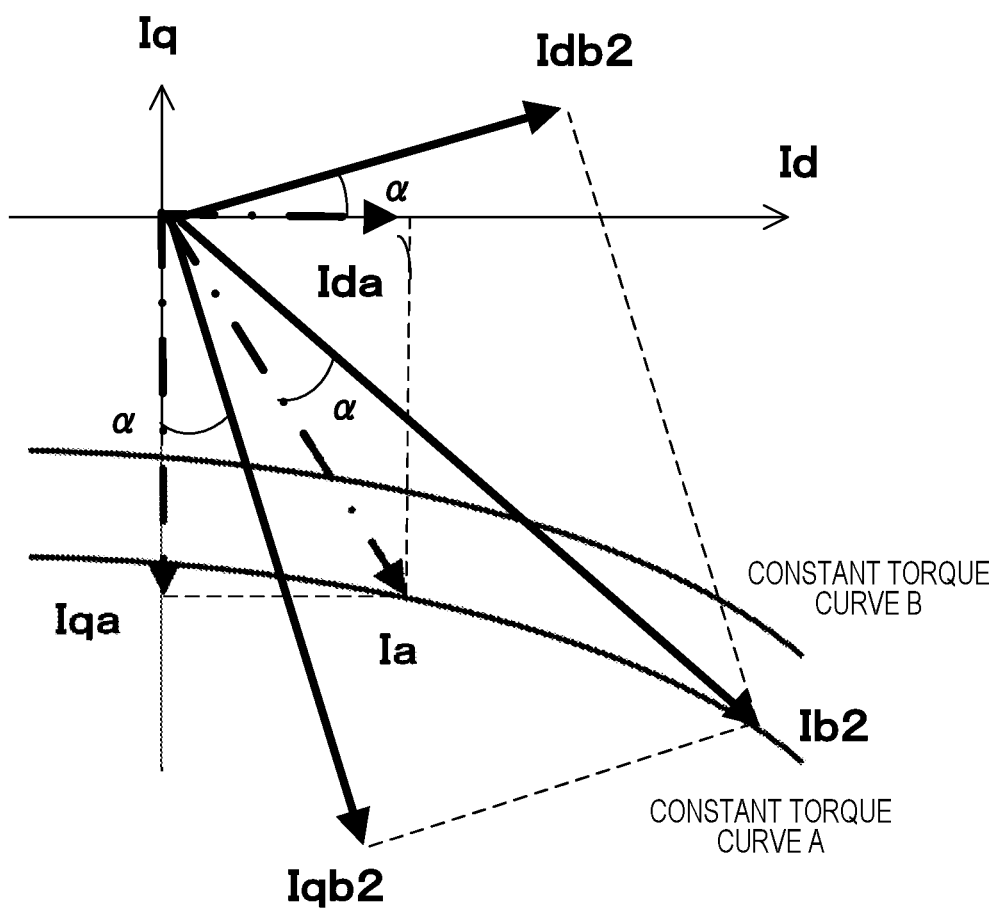
FIG. 11 is a graph illustrating the d-axis current value Ida and the q-axis current value Iqa in the efficiency optimum control of FIG. 8 and the d-axis current value Idb2 and the q-axis current value Iqb2 in the strong field control (current consumption control).

As a result, as illustrated in FIG. 11, the torque reduction due to the error angle α (difference between the constant torque curve B and the constant torque curve A) is adjusted to the original torque (the operating point Ib2 of the constant torque curve A) by the feedback control. Such adjustment leads to excessive consumption of current. Accordingly, since the efficiency of the motor generator control system 100 is deteriorated, the amount of charge by the regenerative braking can be limited and the deterioration of the high-voltage battery BATh can be prevented even when the high-voltage battery BATh is close to the fully charged state. In addition, the strong field control (current consumption control) does not require a dedicated map or a special control unit, and thus can be realized by normal strong field control and feedback control, which limits the complexity of control.

In the strong field control (current consumption control), the resolver phase corrector 18 only needs to change the value of the rotor rotation angle to a value (θ_act+θ_sf) at which the drive torque Tq is smaller than the target torque Tq*. Therefore, the consumed current can be increased without performing complicated control. In other words, the drive efficiency can be reduced by shifting the resolver detection angle (phase) with respect to the rotor by using a rotation angle that has a margin in advance corresponding to the detection error of the resolver 8.

Figure 12:
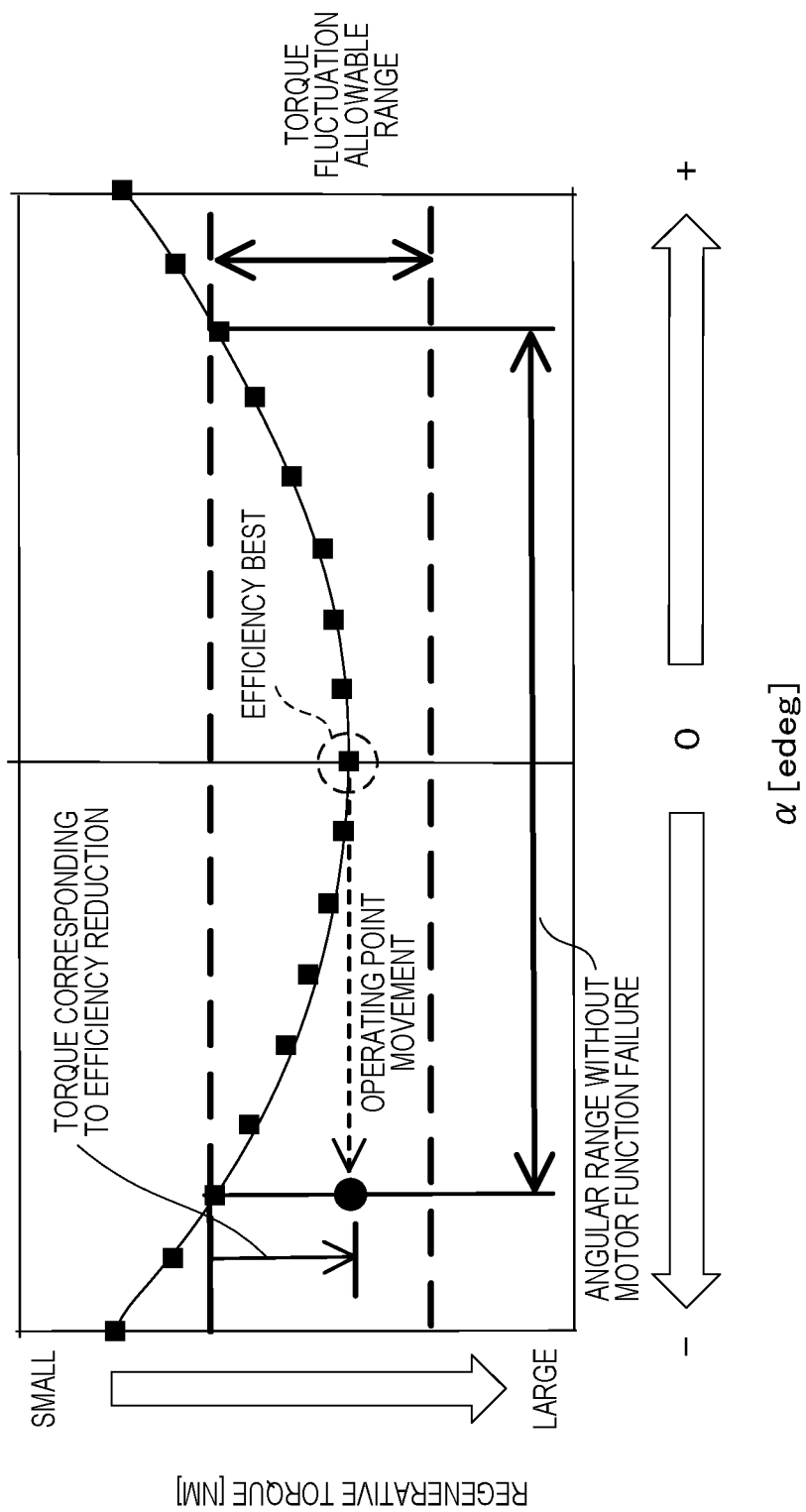
FIG. 12 is a graph illustrating a correlation between the error angle α and a regenerative torque.

Here, the magnitude of the error angle α will be described. FIG. 12 is a graph illustrating the correlation between the error angle α and the regenerative torque. As described above, the error angle α is the difference between the resolver zero point correction value θ_sf for strong field control and the resolver zero point correction value θ_ref for efficiency optimum control. Therefore, when the error angle α is zero, the magnetic pole rotation angle θ is a value obtained by adding the resolver zero point correction value θ_ref for efficiency optimum control to the magnetic pole detection angle θ_act. Therefore, the drive efficiency is the best (efficiency best in FIG. 12), and the regenerative torque is maximum. The error angle α increasing in the + direction or the − direction may lead to the deviation of the actual torque with respect to the target torque Tq*, the inverter damage due to the increase in the current peak, and the motor function failure such as the rotor magnet abnormal heat generation and the demagnetization generation. Therefore, the strong field control (current consumption control) is executed in a range in which the difference generated by the error angle α between the target torque Tq* and the actual torque is smaller than a predetermined torque fluctuation allowable range.

Further, by performing the strong field control (current consumption control) and the correction of the detection angle of the resolver 8 in a positive region on the d-axis (see FIGS. 4 and 5), the drive efficiency can be reduced reliably.

Figure 13:
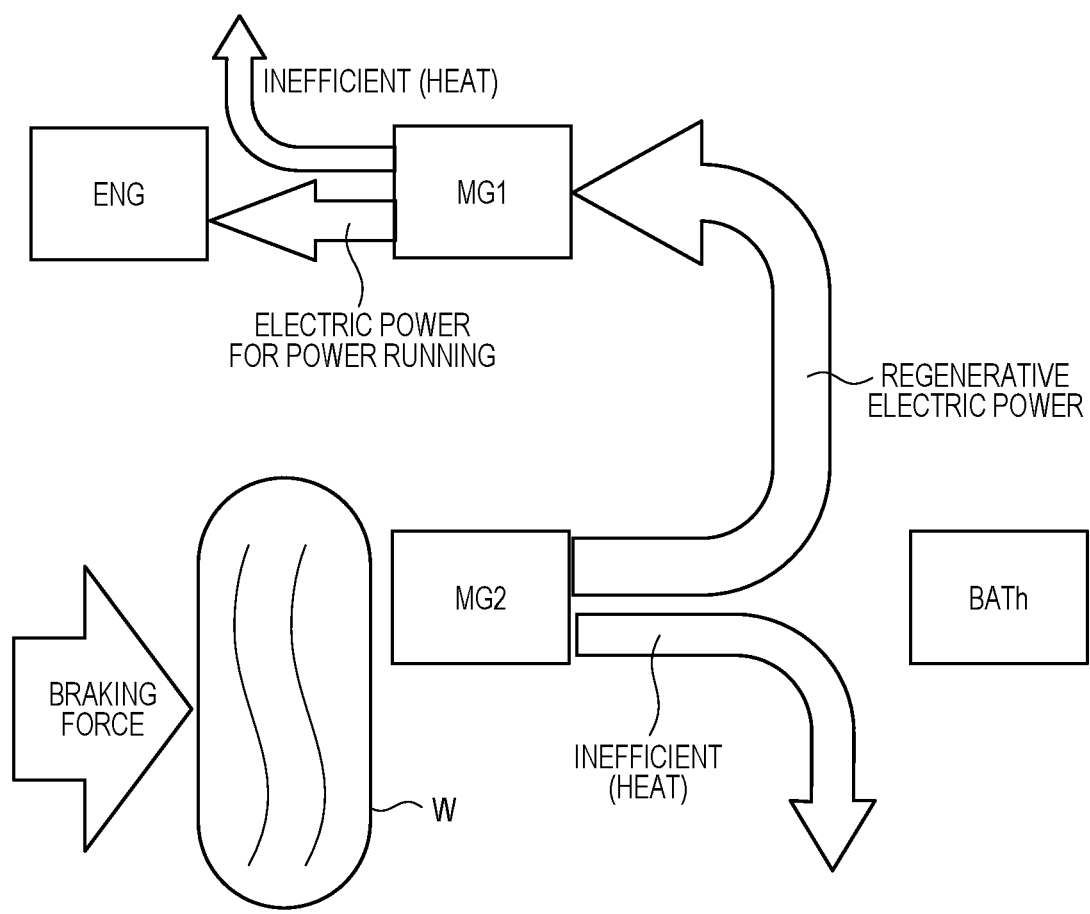
FIG. 13 is a diagram illustrating an example of a flow of energy in the strong field control (current consumption control).

The strong field control (current consumption control) may be performed during power running of the first motor generator MG1. That is, by performing strong field control (current consumption control) at the time of power running of the first motor generator MG1, the drive current increases due to deterioration of the conversion efficiency, and a large amount of regenerative current generated in the second motor generator MG2 can be consumed. In the example of FIG. 13, the strong field control (current consumption control) is performed at the time of regeneration of the second motor generator MG2, and strong field control (current consumption control) is performed at the time of power running of the first motor generator MG1. Thereby, the regenerative current generated by the second motor generator MG2 decreases, and the drive current consumed by the first motor generator MG1 further increases, which achieves further power consumption as a whole system.

Although various embodiments have been described above with reference to the drawings, it is needless to say that the present invention is not limited to such examples. It is apparent to those skilled in the art that various changes and modifications can be conceived within the scope of the claims, and it is also understood that such variations and modifications belong to the technical scope of the present invention. Components in the embodiments described above may be combined freely within a range not departing from the spirit of the invention.

For example, the hybrid vehicle described above is an HEV of the series type, but may be an HEV of the parallel type or an HEV capable of switching between the series type and the parallel type.

In addition, at least the following matters are described in the present specification. Although corresponding constituent elements and the like in the above embodiment are shown in parentheses, the present invention is not limited thereto.

(1) A motor generator control system (motor generator control system 1) including:
    a motor generator (second motor generator MG2) configured to perform power running using electric power from a capacitor (high-voltage battery BATh), and to regenerate by a driving force input from a drive wheel (drive wheels W) to charge the capacitor;
    a drive current control unit (drive current control unit 3) configured to perform feedback control based on a drive current (drive currents Iu, Iv) of the motor generator so that the driving force at a time of power running or the driving force (drive torque Tq) at a time of regeneration of the motor generator is a target driving force (target torque Tq*);
    a current coordinate control unit (current coordinate converter 12) configured to calculate a d-axis current value (d-axis current value Id) and a q-axis current value (q-axis current value Iq) based on the drive current of the motor generator and output the d-axis current value and the q-axis current value to the drive current control unit; and
    a strong field control unit (strong field control command unit 21) configured to perform strong field control of setting a field to be stronger than a field strength at which a maximum efficiency is obtained on a constant driving force line of the motor generator, in which
    when the strong field control is performed during the regeneration, the motor generator control system executes current consumption control of performing the feedback control by changing the d-axis current value (Ida) and the q-axis current value (Iqa) such that the driving force is smaller than the target driving force (Idb, Iqb).

According to (1), when the strong field control is performed at the time of regeneration, the feedback control is performed by the driving force current control unit such that the d-axis current value and the q-axis current value are changed such that the driving force is smaller than the target driving force. Thereby, the driving force is adjusted to the target driving force due to the feedback control, and a current is excessively consumed due to the adjustment. As a result, the drive efficiency of the motor generator control system is reduced, and the amount of charge of the capacitor by the regenerative braking can be limited when the capacitor is in a fully charged state or a state close to the fully charged state, so that the deterioration of the capacitor can be prevented.

(2) The motor generator control system according to (1), further including:
    a resolver (resolver 8) configured to detect a rotor rotation angle of the motor generator; and
    a resolver phase change unit (resolver phase corrector 18) configured to change a value of the rotor rotation angle and output the value to the current coordinate control unit, in which
    in the current consumption control, the resolver phase change unit changes the value of the rotor rotation angle (θ_act+θ_ref) to a value at which the driving force is smaller than the target driving force (θ_act+θ_sf), and outputs the value to the current coordinate control unit.

According to (2), when the strong field control is performed at the time of regeneration, the resolver phase change unit only needs to change the resolver zero point correction value. Therefore, the consumed current can be increased without performing complicated control. In other words, the drive efficiency can be reduced by shifting the resolver detection angle (phase) with respect to the rotor by using a rotation angle that has a margin in advance corresponding to the detection error of the resolver.

(3) The motor generator control system according to (2), in which
    the current consumption control is executed in a range in which a difference between the target driving force and an actual driving force generated by a difference in a detected angle of the resolver with respect to a reference point of the rotor rotation angle is smaller than a predetermined value.

According to (3), when the difference in the detection angle of the resolver with respect to the reference point of the rotation angle of the rotor is increased, the actual driving force cannot follow the target driving force, and fluctuation in the driving force occurs. Therefore, due to a risk of motor function failure that hinders driving, the value of the detection angle is changed in a range in which the difference in the driving force is smaller than the predetermined value. As a result, the drive efficiency can be reduced in a range in which the function failure does not occur.

(4) The motor generator control system according to (3), in which the strong field control and the change of the detected angle are executed in a positive region on a d axis.

According to (4), the strong field control and the correction of the detection angle of the resolver are performed in the positive region on the d axis, and thus the drive efficiency can be reduced reliably.

(5) A hybrid vehicle (HEV) including:
an internal combustion engine (engine ENG);
a capacitor (high-voltage battery BATh);
a first motor generator (first motor generator MG1) configured to generate electric power by power of the internal combustion engine;
a second motor generator (second motor generator MG2) configured to be driven by electric power from the capacitor or the first motor generator; and
the motor generator control system (motor generator control system 1) according to any one of (1) to (4), in which:
the motor generator of the motor generator control system is the second motor generator;
at a time of regeneration in the second motor generator, the hybrid vehicle performs power running by regenerative electric power of the second motor generator, with the first motor generator as an electric motor, and executes the current consumption control for the second motor generator; and
at a time of power running of the first motor generator, the hybrid vehicle takes the internal combustion engine as a load of the first motor generator, changes the d-axis current value (Ida) and the q-axis current value (Iqa) of the first motor generator such that the driving force is smaller than the target driving force (Idb, Iqb), and performs the feedback control based on a drive current (Iu, Iv) of the first motor generator such that the driving force (drive torque Tq) at a time of power running of the first motor generator is the target driving force (target torque Tq*).

According to (5), it is possible to reduce the drive efficiency of the entire system by causing the efficiency to deteriorate even when the first motor generator is driven with the engine being the load due to the waste electric power, together with the second motor generator.

The invention claimed is:

1. A motor generator control system comprising:
a motor generator configured to perform power running using electric power from a capacitor, and to regenerate by a driving force input from a drive wheel to charge the capacitor;
a drive current control unit configured to perform feedback control based on a drive current of the motor generator so that the driving force at a time of power running or the driving force at a time of regeneration of the motor generator is a target driving force;
a current coordinate control unit configured to calculate a d-axis current value and a q-axis current value based on the drive current of the motor generator and output the d-axis current value and the q-axis current value to the drive current control unit; and
a strong field control unit configured to perform strong field control of setting a field to be stronger than a field strength at which a maximum efficiency is obtained on a constant driving force line of the motor generator, wherein
when the strong field control is performed during the regeneration, the motor generator control system executes current consumption control of performing the feedback control by changing the d-axis current value and the q-axis current value so that the driving force is smaller than the target driving force.

2. The motor generator control system according to claim 1, further comprising:
a resolver configured to detect a rotor rotation angle of the motor generator; and
a resolver phase change unit configured to change a value of the rotor rotation angle and output the value to the current coordinate control unit, wherein
in the current consumption control, the resolver phase change unit changes the value of the rotor rotation angle to a value at which the driving force is smaller than the target driving force, and outputs the value to the current coordinate control unit.

3. The motor generator control system according to claim 2, wherein
the current consumption control is executed in a range in which a difference between the target driving force and an actual driving force generated by a difference in a detection angle of the resolver with respect to a reference point of the rotor rotation angle is smaller than a predetermined value.

4. The motor generator control system according to claim 3, wherein
the strong field control and the change of the detection angle are executed in a positive region on a d axis.

5. A hybrid vehicle comprising:
an internal combustion engine;
a capacitor;
a first motor generator configured to generate electric power by power of the internal combustion engine;
a second motor generator configured to be driven by electric power from the capacitor or the first motor generator; and
the motor generator control system according to claim 1, wherein:
the motor generator of the motor generator control system is the second motor generator;
at a time of regeneration in the second motor generator, the hybrid vehicle performs power running by regenerative electric power of the second motor generator, with the first motor generator as an electric motor, and executes the current consumption control for the second motor generator; and
at a time of power running of the first motor generator, the hybrid vehicle takes the internal combustion engine as a load of the first motor generator, changes the d-axis current value and the q-axis current value of the first motor generator so that the driving force is smaller than the target driving force, and performs the feedback control based on a drive current of the first motor generator so that the driving force at a time of power running of the first motor generator is the target driving force.

* * * * *